United States Patent Office 3,219,592
Patented Nov. 23, 1965

3,219,592
SILICA-ALUMINA CRACKING CATALYSTS ION-EXCHANGED WITH CUPROUS COPPER, SILVER, OR AUROUS GOLD
Alfred E. Hirschler, Springfield, Pa., assignor to Sun Oil Company, Philadelphia, Pa., a corporation of New Jersey
No Drawing. Filed Aug. 8, 1961, Ser. No. 129,984
8 Claims. (Cl. 252—455)

This invention relates to novel catalyst compositions having improved cracking activity, to their method of preparation and to the cracking of hydrocarbons utilizing the catalyst compositions.

Amorphous synthetic silica-alumina catalysts are widely used to promote the cracking of hydrocarbons. It has now been found that the cracking activity of this type of catalyst or of the acid treated natural clay catalysts can be substantially increased by ion exchanging the catalyst with aqueous salt solutions containing certain metal ions, namely, cuprous copper, silver or aurous gold. Any of these metals when incorporated in the lattice of the catalyst in minor amount generally in the range of 0.1–5.0% by weight by ion exchange unexpectedly causes a marked increase in the catalytic activity of such silica-alumina catalysts.

Preparation of the present catalyst compositions is carried out by treating a conventional silica-alumina catalyst with an aqueous solution of a silver salt, an aurous gold salt or a cuprous copper salt in a manner to effect ion exchange and to incorporate the metal ion from the solution into the lattice of the catalyst. Cupric copper and auric gold salts cannot be used in practicing the invention, since when incorporated in the catalyst by ion exchange they have the effect of decreasing the catalytic activity. Mixed salts of the specified metals can be used if desired. The anion portion of the salt employed is immaterial as long as the salt is sufficiently water soluble, since by the method of preparation the anion does not become incorporated in the catalyst. Examples of salts which can be used for ion exchange with the silica-alumina catalysts are silver nitrate, silver acetate, cuprous chloride, cuprous ammonium formate, cuprous acetate and cuprous ammonium acetate. Aurous salts such as aurous chloride tend to be too insoluble for use as such, but sufficient aurous ions can be obtained in solution by complexing the aurous salt with ammonia or amines.

The procedure of preparing the catalyst involves admixing a silica-alumina cracking catalyst with a relatively large volume of an aqueous solution of an appropriate salt, as specified above, and agitating the mixture for a time sufficient to permit ion exchange to take place. The concentration of salt in the treating solution can vary widely but generally a dilute solution such as 0.1–2.0 molar is used. The treatment can be done at room temperature or elevated temperatures can be used to expedite the ion exchange reaction. The time of contact of the aqueous solution can vary widely, e.g. from 10 minutes to 10 hours. After the treating solution has been drained from the catalyst, the treatment can be repeated one or more times with additional amounts of the aqueous solution to insure the incorporation of a sufficient amount of metal ion in the catalyst lattice. It is not certain just what ion or ions from the silica-alumina catalyst composition exchange with the metal ions from the solution but it appears likely that the transfer at least in part involves a replacement of hydrogen ions by the metal ions.

An alternative procedure for effecting the ion exchange involves placing the silica-alumina catalyst in a column and percolating the salt solution through the column. This method generally provides for more efficient utilization of the salt.

After the ion exchange reaction has been effected, the treated catalyst is washed one or several times with a relatively large volume of water to remove all of the treating solution not drained from the catalyst. This also insures removal of all of the exchange ions that have been displaced from the catalyst. Hence the present procedure differs from prior art procedures in which a catalyst base has been impregnated with a treating agent and then dried and calcined, thus leaving all of the treating agent and all components from the catalyst base in the final composition. The washed catalyst is finally dried and calcined to obtain the composition used according to the present invention.

From the foregoing it can be seen that the catalysts prepared according to the present invention are amorphous synthetic silica-alumina catalysts or acid treated clay catalysts in which some of the original ions within the lattice thereof have been displaced by metal ions which are either silver, cuprous copper or aurous gold. Generally the amount of such metal ion incorporated in the final composition is 0.1–5.0% by weight. The silica-alumina starting material can be amorphous synthetic silica-alumina, silica-alumina-thoria or silica-alumina-zirconia or can be acid treated siliceous clays such as montmorillonite and kaolin. The silica-alumina catalyst can be either calcined or uncalcined prior to the ion exchange reaction.

Catalysts prepared in the foregoing manner have markedly increased activities for cracking hydrocarbons as compared to the original silica-alumina composition. The catalyst can be used to effect the cracking reaction under conventional hydrocarbon cracking conditions including a temperature in the range of 375–550° C.

The following examples illustrate the invention more specifically:

Example I

A one molar aqueous solution of $AgNO_3$ was prepared by dissolving 76.5 g. of the salt in 450 ml. of water. 50 g. of a commercial silica-alumina catalyst having an alumina content of about 12% by weight and a mesh size of 60–210 (U.S. Sieve Series) was treated with the solution in three steps using one-third of the solution in each step. The treatment involved stirring the catalyst with 150 ml. of the $AgNO_3$ solution for 4 hours, filtering the solution from the catalyst and repeating this procedure two more times. The catalyst was then thoroughly washed with water, dried and calcined at 500° C. Analysis of the treated catalyst showed that it contained 2.6% silver by weight. This is equivalent to 0.26 meq. of Ag ion per gram of catalyst. The activity of the catalyst for cracking cumene was tested as hereinafter described.

Example II

A one molar aqueous mixture of cuprous chloride was prepared by adding 74.3 g. of $Cu_2Cl_2$ to 750 ml. of water. 30 g. of the same silica-alumina catalyst as in Example I was treated three successive times using 250 ml. of the $Cu_2Cl_2$-water mixture each time. In this case only part of the salt was dissolved in the water due to its low solubility. The treated catalyst was washed sufficiently with water to remove all the $Cu_2Cl_2$ not consumed by ion exchange, and the washed catalyst was dried and calcined. Analysis showed that the treated catalyst contained 1.9% copper by weight, equivalent to 0.30 meq. of cuprous ion per gram. Its cracking activity was also determined.

Each of the foregoing compositions was tested as a catalyst for promoting the cracking of cumene. The catalyst was used as a fixed bed in a flow reactor, and the liquid hourly space velocity was 50. The results as listed in the accompanying table are for the average reaction product during one hour operation. Runs were also made using the untreated silica-alumina for comparison. Cracking temperatures used were as shown in the table. The conversion was taken as molar percent cumene converted to benzene.

| Catalyst | Cracking Temp., °C. | Percent Conversion | Percent Carbon Formed |
|---|---|---|---|
| Untreated | 400 | 5.8 | 4.6 |
| Do | 440 | 13.6 | 4.4 |
| Do | 500 | 24.8 | 4.4 |
| I (Ag+) | 380 | 8.1 | 6.3 |
| I (Ag+) | 440 | 31.2 | 5.3 |
| II (Cu+) | 440 | 22.7 | 6.1 |

From the tabulated data it can be seen that each of the metal ions caused a substantial increase in the activity of the silica-alumina catalyst. At 440° C., the silver ion caused the conversion to increase from 13.6% to 31.2% corresponding to an activity increase of about 130%. At the same temperature the copper ion caused an activity increase of 67%. While not specifically shown, the aurous gold ion likewise results in marked increase in cracking activity.

The cracking of cumene is merely illustrative of the improvement effected in the cracking of hydrocarbons by means of the present invention. Similar improvements are attained in the cracking of other hydrocarbon stocks such as paraffins or gas oils.

I claim:

1. Catalyst composition consisting essentially of a silica-alumina cracking catalyst selected from the group consisting of amorphous synthetic silica-alumina, amorphous synthetic silica-alumina-thoria, amorphous synthetic silica-alumina-zirconia, acid treated montmorillonite and acid treated kaolin, said catalyst having incorporated in the lattice thereof by ion exchange a metal selected from the group consisting of cuprous copper, silver and aurous gold, the amount of said metal incorporated into the catalyst by ion exchange being 0.1–5.0% by weight of the composition when dried and calcined.

2. Catalyst composition according to claim 1 wherein said metal is cuprous copper.

3. Catalyst composition according to claim 1 wherein said metal is silver.

4. Catalyst composition according to claim 1 wherein said metal is aurous gold.

5. Method of preparing a cracking catalyst composition which comprises contacting a silica-alumina cracking catalyst selected from the group consisting of amorphous synthetic silica-alumina, amorphous synthetic silica-alumina-thoria, amorphous synthetic silica-alumina-zirconia, acid treated montmorillonite and acid treated kaolin with an aqueous solution of a salt in which the metal is selected from the group consisting of cuprous copper, silver and aurous gold, draining the solution from the catalyst, washing the catalyst wtih water to remove excess solution therefrom and thereafter drying and calcining the composition, the amount of said aqueous solution and the time of contacting it with the cracking catalyst being such as to incorporate into the lattice thereof by ion exchange an amount of said metal equivalent to 0.1–5.0% by weight of the dried and calcined composition.

6. Method according to claim 5 wherein said metal is cuprous copper.

7. Method according to claim 5 wherein said metal is silver.

8. Method according to claim 5 wherein said metal is aurous gold.

References Cited by the Examiner

UNITED STATES PATENTS

| | | | |
|---|---|---|---|
| 1,840,450 | 1/1932 | Jaeger et al. | 252—455 |
| 2,271,319 | 1/1942 | Thomas et al. | 252—455 X |
| 2,779,742 | 1/1957 | Emmett | 252—455 |
| 2,916,437 | 12/1959 | Gilbert | 208—120 |
| 2,920,052 | 1/1960 | Martin | 252—462 |
| 2,935,483 | 5/1960 | Schwartz | 252—455 |
| 2,962,435 | 11/1960 | Fleck et al. | 208—119 |
| 2,971,903 | 2/1961 | Kimberlin et al. | |
| 3,013,985 | 12/1961 | Breck et al. | 252—455 |

MAURICE A. BRINDISI, *Primary Examiner.*

JOSEPH R. LIBERMAN, *Examiner.*